Jan. 4, 1966                    M. E. ASH                    3,227,557
                  CONTINUOUS FERMENTATION PROCESS WITH
                       SEDIMENTABLE MICROORGANISMS
                          Filed July 30, 1962
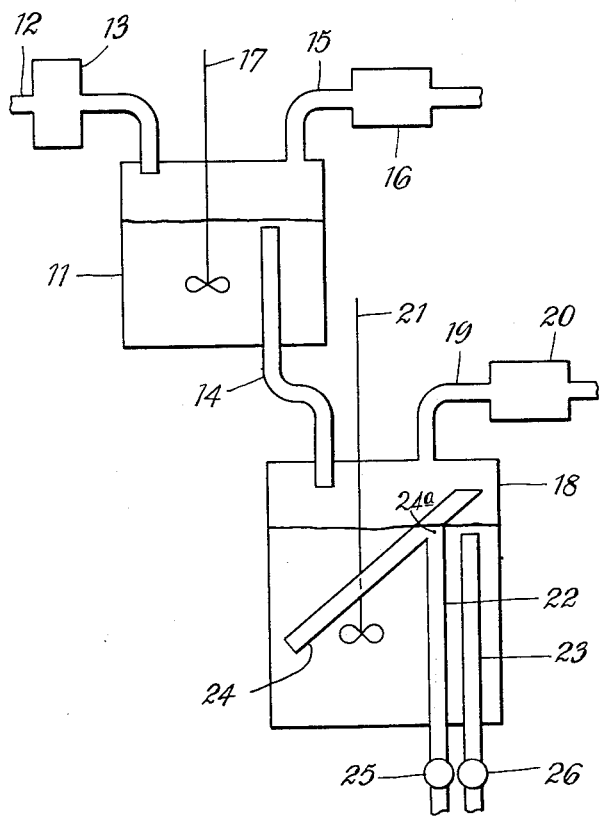

United States Patent Office 3,227,557
Patented Jan. 4, 1966

3,227,557
CONTINUOUS FERMENTATION PROCESS WITH SEDIMENTABLE MICROORGANISMS
Michael Edward Ash, London, England, assignor to Arthur Guinness Son and Company (Park Royal) Limited, London, England, a British company
Filed July 30, 1962, Ser. No. 213,313
6 Claims. (Cl. 99—52)

This invention relates in general to continuous fermentation systems of the kind in which liquid suspensions comprising a dispersion of said fermentable micro-organisms in a liquid substrate of relatively lower specific gravity, are caused to flow through a fermenting vessel or series of vessels.

More specifically, the invention is concerned with a method and apparatus for controlling the relative degree of concentration of micro-organism in substrate as between any two or all of the stages: inflow, vessel and outflow.

In particular, the invention has been developed for use in connection with the continuous fermentation of Brewer's wort in a chemostat system.

The invention is however believed to be applicable to any microbiological process in which a sedimentable micro-organism is operated in a nutrient liquid, and is in the form of a mechanical dispersion in liquid nutrient of relatively lower specific gravity, so that in the absence of turbulence, the micro-organism tends to settle at the bottom of the vessel.

It has already been proposed continuously to ferment Brewer's wort or other fermentable substrate in a plurality of sequentially arranged stirred or unstirred vessels, and to separate the fermenting micro-organism (yeast) from the fermented product (beer) by settlement in a separate vessel or in a part of the final fermentation vessel separated from a stirred region by a baffle.

Considerations of efficiency and consistency of product normally require the maintenance of a predetermined concentration of micro organism in the various vessels used in continuous fermentation processes of this kind. For example, in a chemostat system, a constant volume of substrate is held in a fermenting vessel and substrate passes continuously through that vessel under equilibrium flow conditions, and a steady reaction is maintained within that vessel. It is frequently desirable for the concentration of micro-organisms in the vessel to be relatively high and considerably higher than the average concentration of organism flowing through the system. Hitherto such concentration has usually been achieved by separating the organism from the effluent and recycling some of the separated organism.

In such fermentation processes, a certain amount of autolysis of the organism is liable to take place during the time when it is maintained at high concentration of effluent in the separating chamber and in associated conduits. If the micro-organism is recycled, it will carry with it some of the autolyised micro-organism, which latter will tend to build up in the fermentation vessel. Moreover, recycling can involve danger that any infection of the micro-organism in the effluent before or after separation will result in the infected recycled micro-organism passing on infection to the micro-organism in the vessel itself. This danger can be avoided if all micro-organisms passing through the system are separated from the effluent and are never recycled.

It is an object of the present invention to provide a simple and easily operable method for effecting, in a continuous fermentation system, controlled variation of the degree of concentration of the micro-organism in the main body of substrate in the vessel relative to the concentration in the inflow and/or in the outflow, without the necessity for recycling, and without upsetting the equilibrium flow conditions.

In a chemostatic process for the continuous fermentation of sedimentable micro-organism in a substrate of lower specific gravity, involving continuous equilibrium volumetric flow of substrate through one or a series of vessels containing micro-organism, the main body of substrate in the vessel or in each of them being agitated to maintain homogeneity of dispersion of micro-organism in the substrate; a method of obtaining in the effluent from any vessel, a concentration of micro-organism which is lower than the concentration of micro-organism in the main body of substrate in that vessel, without recycling through that vessel micro-organism taken from the effluent of that vessel and without upsetting equilibrium volumetric flow conditions, which includes the steps of partially isolating a region in that vessel from the effects of agitation, whereby the tendency of the micro-organism to settle in the isolated region produces a concentration of micro-organism in the substrate in that region which varies from a minimum at the surface to a maximum at the bottom; withdrawing from the isolated region a first stream of effluent having a substantially lower concentration of micro-organism than the average concentration in the vessel; withdrawing from the main body of substrate a second stream of effluent in which the concentration of micro-organism approximates to the average obtaining throughout the vessel, and so relating and adjusting the volumetric flow rates of the first and second streams that their aggregate volumetric flow rate is equal to the volumetric flow rate of substrate into the vessel and that the average concentration of micro-organism in the total effluent constituted by their aggregate, is any desired amount less than the average concentration of micro-organism in the main body of substrate in the vessel.

It will be seen that where it is desired to maintain a greater concentration of micro-organism in the substrate in the vessel itself than the average concentration in the liquid flowing through the system, steps must be taken to provide an initial build-up of micro-organism in the vessel.

Where the present invention is applied to a continuous fermentation process, wherein a series of vessels is employed through which continuous flow of substrate takes place, and wherein the inflow to the second and subsequent vessels in the series is constituted by substrate containing a predetermined concentration of micro-organism, there is provided a method of obtaining and maintaining in the main body of substrate in the second or in any subsequent vessel, a greater concentration of micro-organism than the concentration of micro-organism in the substrate entering that vessel or in the effluent leaving that vessel, which includes the steps of adjusting the relative volumetric flow rates of the first and second streams of effluent, without reducing the aggregate volumetric flow rate of effluent, so that the average concentration of micro-organism in the aggregate of the two streams of effluent is initially reduced, whereby the concentration of micro-organism in the main body of substrate in the vessel is increased; and subsequently, when this increase has attained the desired level, re-adjusting the relative flow of the first and second streams, without increasing the aggregate volumetric flow rate of effluent, until the average concentration of micro-organism in the aggregate of the two streams of effluent has been increased to an extent where that concentration becomes the same as the concentration in the inflow, thereby maintaining equilibrium flow conditions through the vessel at all stages.

In applying the invention to the control of the concentration of micro-organism in substrate in a continuous fermentation process, we may, in one way of operating the process, adjust the volumetric flow rates of the first and second streams of effluent from a vessel so that they are equal to each other and to the volumetric flow rate of the inflow to that vessel; and then cause the first and second streams of effluent to flow intermittently and alternately for short periods, and adjust their periodicity of flow so as to provide the required concentration of micro-organism in the effluent constituted by the aggregate of the two streams over a prolonged period.

In an alternative way of operation, we may cause both the said streams to flow together at an aggregate volumetric flow rate equal to the volumetric flow rate of the inflow to that vessel, and adjust the relative flows of the two streams to provide the required concentration of micro-organism in the effluent constituted by the aggregate of the two streams.

It has been found that optimum results are obtainable when the isolated region comprises a column inclined to the vertical. This is believed to be because micro-organism, tending to settle, is allowed to travel downwardly beneath rising liquid and gaseous bubbles (if any), and thus is not carried upwardly again.

The invention is particularly suitable for chemostat systems for the continuous fermentation of Brewer's wort in which the sedimentable yeasts are carried in a wort substrate.

It will be observed that the invention avoids the requirement for recycling the micro-organism and, in the case of brewing, I have found that the capacity of the equipment for separating micro-organism from substrate in the effluent does not need to be as great as in conventional continuous fermentation systems, since it is required to handle only the surplus micro-organism in the effluent and not the additional amount which would be required in the case of recycling.

The invention will now be further described by reference to the accompanying diagrammatic drawing which illustrates this invention when applied to the continuous fermentation of Brewer's wort in the second vessel of a multiple vessel system.

Referring to the drawing, fresh wort enters a pre-fermenter vessel 11 through an inflow pipe 12 by way of an aerater 13 and emerges through an outflow pipe 14. A vent 15, together with a filter 16, for preventing entry of infection to vessel 11, and a stirrer 17 are provided.

The outflow pipe 14 communicates with the top of a fermentation vessel 18. The vessel 18 has a vent 19, a fermentation filter 20, a stirrer 21 and primary and secondary effluent pipes 24, 22 and 23. The primary effluent pipe comprises a shielding part 24 which is set at an angle to the vertical and extending above the surface of the liquid, and a second part, constituting a draw-off pipe 22 extending downwardly from a point just below the level of the wort and leading out through the bottom of the vessel.

Valves 25 and 26 are provided respectively on the primary and secondary effluent pipes 22 and 23, whereby the relative volumetric flow rates of primary and secondary effluent may be controlled to obtain the desired concentration of yeast in the aggregate effluent.

The operation of the invention will be described with reference to Brewer's wort. Aerated wort is fed to the pre-fermenter vessel 11 which has been seeded with yeast. The yeast is kept distributed by the stirrer 11 and under the aerobic conditions present multiplies, the growth rate being controllable by temperature. A proportion of the yeast within the vessel 11 leaves the vessel as a suspension in the wort through the pipe 14. The dwell-time of the wort in the vessel is arranged so that the amount of yeast leaving the vessel is equivalent to that formed by growth, and thus a steady yeast concentration is obtained in the vessel.

The effluent from the vessel 11 passes to the vessel 18 where under substantially anaerobic conditions it ceases to multiply and fermentation takes place. The wort yeast suspension is stirred and can leave the vessel through the primary and secondary effluent pipes 24, 22 and 23. In order for the suspension to reach the mouth of the primary effluent pipe it has to travel up the sloping shielding part 24, which protects the suspension within it from the effects of agitation. Thus the yeast, being sedimentable will tend to run down the lower wall of the shielding pipe. By the time the wort, which has by now fermented, reaches the upper part 24*a* of the primary effluent pipe 24, 22 it carries little or no yeast and is withdrawn in a substantially yeast free state.

Wort, carrying yeast at the average concentration obtaining in the main body of wort within the vessel 18, is withdrawn through the secondary effluent pipe 23 and by mixing the primary and secondary effluents (in one of the conventional ways above described,) the concentration of yeast in the aggregate effluent may be controlled.

Thus by first removing only a small amount of yeast the concentration of yeast within the vessel 18 may be built up, and by subsequently withdrawing a greater amount of yeast the concentration of yeast within the vessel 18 can be kept steady at a level of concentration higher than that wtihin the wort entering the vessel. Under normal chemostat conditions the levels of concentration of yeast in the wort entering and leaving the vessel 18 will be similar, and equilibrium flow conditions will obtain.

I claim:

1. In a chemostatic process for the continuous fermentation of sedimentable micro-organism in a substrate of lower specific gravity, involving continuous equilibrium volumetric flow of substrate through at least one fermenter vessel containing micro-organism, the main body of substrate in said vessel being agitated to maintain homogeneity of dispersion of said microorganism in said substrate; a method of obtaining in the effluent from said vessel a concentration of said micro-organism which is lower than the concentration of said micro-organism in said main body of substrate in said vessel, without recycling through said vessel micro-organism taken from said effluent and without upsetting equilibrium volumetric flow conditions, said method including the steps of partially isolating a region in said vessel from the effects of agitation, whereby the tendency of said micro-organism to settle in said isolated region produces a concentration of micro-organism in the substrate in said isolated region which varies from a minimum at the surface to a maximum at the bottom; withdrawing from said isolated region a first stream of effluent having a substantially lower concentration of micro-organism than the average concentration in said main body of substrate; withdrawing from said main body of substrate a second stream of effluent in which the concentration of micro-organism approximates to the average obtaining throughout said main body, and so relating and adjusting the volumetric flow rates of said first and second streams that their aggregate volumetric flow rate is equal to the volumetric flow rate of substrate into said vessel and that the average concentration of micro-organism in the total effluent constituted by the aggregate of said streams is any desired amount less than the average concentration of micro-organism in said main body of substrate in said vessel.

2. In a continuous fermentation process wherein a series of fermenter vessels is employed and wherein the inflow to any subsequent vessel in said series other than the first vessel is constituted by substrate containing a predetermined concentration of micro-organisms; a method as defined in claim 1 of obtaining and maintaining in the main body of substrate in any subsequent vessel, a greater concentration of micro-organism than the concentration of micro-organism in the substrate entering said vessel or in the effluent leaving that vessel, which includes the steps of adjusting the relative volumetric flow rates of said first and second streams of effluent, without reducing said aggregate volumetric flow rate of effluent, so that the average concentration of micro-organism in the aggregate of said two streams of effluent is initially reduced, whereby the concentration of micro-organism in said main body of substrate in said vessel is increased; and after this increase has attained the desired level, readjusting the relative flow of said first and second streams without increasing said aggregate volumetric flow rate of effluent, until the average concentration of micro-organism in said aggregate of said two streams of effluent has been increased to an extent where said concentration becomes the same as the concentration in the inflow to said vessel, thereby maintaining equilibrium flow conditions through said vessel at all stages.

3. A method as defined in claim 1, of controlling the concentration of micro-organism in substrate in a continuous fermentation process, which includes the steps of adjusting the volumetric flow rates of said first and second streams of effluent from said vessel so that they are equal to each other and to the volumetric flow rate of the inflow to said vessel; causing said first and second streams of effluent to flow intermittently and alternately for short periods, and adjusting their periodicity of flow to provide the required concentration of micro-organism in the effluent constituted by the aggregate of said two streams over a prolonged period.

4. A method as defined in claim 1, of controlling the concentration of micro-organism in substrate in a continuous fermentation process, which includes the steps of adjusting the aggregate volumetric flow rates of said first and second streams of effluent from said vessel so that said aggregate volumetric flow rate is equal to the volumetric flow rate of the inflow to said vessel; and adjusting the relative flows of said two streams to provide the required concentration of micro-organism in the effluent constituted by the aggregate of said two streams.

5. A method according to claim 3 wherein said substrate is brewers wort and said micro-organisms are brewers yeasts.

6. A method according to claim 4 wherein said substrate is brewers wort and said micro-organisms are brewers yeasts.

References Cited by the Examiner
UNITED STATES PATENTS

| | | | |
|---|---|---|---|
| 2,188,192 | 1/1940 | Scholler et al. | 195—78 |
| 2,793,166 | 5/1957 | Hatch | 195—143 |
| 2,894,841 | 7/1959 | Compton et al. | 99—52 |
| 2,948,617 | 8/1960 | Paine | 99—52 |
| 2,952,588 | 9/1960 | Rinderer | 195—143 |
| 2,967,107 | 1/1961 | Geiger et al. | 99—43 |
| 2,983,652 | 5/1961 | Baerfuss | 195—143 |
| 3,078,166 | 2/1963 | Hough et al. | 99—43 |

A. LOUIS MONACELL, *Primary Examiner.*

A. H. WINKELSTEIN, *Examiner.*

D. M. STEPHENS, *Assistant Examiner.*